US012767099B2

(12) United States Patent
Zhu

(10) Patent No.: US 12,767,099 B2
(45) Date of Patent: Oct. 20, 2026

(54) AIR TREATMENT DEVICE

(71) Applicant: Beijing Xiaomi Mobile Software Co., Ltd., Beijing (CN)

(72) Inventor: Kenan Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 869 days.

(21) Appl. No.: 18/162,521

(22) Filed: Jan. 31, 2023

(65) Prior Publication Data

US 2024/0140370 A1 May 2, 2024

(30) Foreign Application Priority Data

Oct. 26, 2022 (CN) ......................... 202222827756.6

(51) Int. Cl.
*B60T 1/14* (2006.01)
*F24F 8/80* (2021.01)

(52) U.S. Cl.
CPC .................. *B60T 1/14* (2013.01); *F24F 8/80* (2021.01); *F24F 2221/125* (2013.01)

(58) Field of Classification Search
CPC ...... B60T 17/002; B60T 1/14; F16D 2127/02; B62L 3/04; F24F 8/80; F24F 2221/125
See application file for complete search history.

(56) References Cited

U.S. PATENT DOCUMENTS

| | | | | | |
|---|---|---|---|---|---|
| 2,942,693 | A | * | 6/1960 | Johnson | B62B 5/049 280/32.6 |
| 5,035,445 | A | * | 7/1991 | Poulin | B60T 1/14 280/79.11 |
| 5,323,879 | A | * | 6/1994 | Poulin | B62B 5/049 188/19 |
| 2008/0056871 | A1 | | 3/2008 | Morgan et al. | |

FOREIGN PATENT DOCUMENTS

| | | | | | |
|---|---|---|---|---|---|
| CN | 207019263 | U | * | 2/2018 | |
| CN | 108131825 | A | * | 6/2018 | F24F 13/32 |
| CN | 209101426 | U | | 7/2019 | |
| CN | 209384708 | U | * | 9/2019 | |
| CN | 213089952 | U | * | 4/2021 | |
| CN | 216035050 | U | * | 3/2022 | |
| EP | 1749728 | A2 | * | 2/2007 | B62B 5/049 |
| FR | 1391000 | A | * | 3/1965 | B60B 33/0089 |
| GB | 574386 | A | * | 1/1946 | B61K 7/20 |

* cited by examiner

*Primary Examiner* — Robert A. Siconolfi
*Assistant Examiner* — Mahbubur Rashid
(74) *Attorney, Agent, or Firm* — McCoy Russell LLP

(57) ABSTRACT

The disclosure relates to an air treatment device, including: a device body, configured for air treatment; wheels, arranged on the device body and configured to drive the device body to move; and a parking mechanism, movably connected to the device body, where the parking mechanism can move relative to the device body to be in contact with or separated from the ground, such that the air treatment device is in a parking state or a free state.

18 Claims, 6 Drawing Sheets

100

AIR TREATMENT DEVICE

CROSS REFERENCE TO RELATED APPLICATIONS

The present application claims the benefit of priority to the Chinese patent application No. 202222827756.6 filed on Oct. 26, 2022, the contents of which are incorporated herein by reference in their entireties for all purposes.

BACKGROUND

A parking mechanism is a common parking mode for an air treatment device with casters. For a traditional air treatment device with casters, the parking mechanism is often designed on wheels. When parking, it is necessary to tighten a parking wrench on each wheel to complete a parking action.

SUMMARY

The disclosure relates to the technical field of parking mechanisms, in particular to an air treatment device.

In order to overcome problems existing in the related art, the disclosure provides an air treatment device.

According to a first aspect of an example of the disclosure, an air treatment device is provided, including: a device body, configured for air treatment; wheels, arranged on the device body and configured to drive the device body to move; and a parking mechanism, movably connected to the device body. The parking mechanism can move relative to the device body to be in contact with or separated from the ground, such that the air treatment device is in a parking state or a free state.

It needs to be understood that the above general descriptions and later detailed descriptions are merely explanatory and illustrative, and cannot limit the disclosure.

BRIEF DESCRIPTION OF THE DRAWINGS

The accompanying drawings here are incorporated into the specification and constitute a part of the specification, show examples consistent with the disclosure, and are used together with the specification to explain the principle of the disclosure.

DETAILED DESCRIPTION

The examples will be described in detail here, and instances are shown in the accompanying drawings. When the following description refers to the accompanying drawings, unless otherwise indicated, the same numbers in different accompanying drawings indicate the same or similar elements. The implementations described in the following examples do not represent all implementations consistent with the disclosure. Rather, they are merely instances of apparatuses and methods consistent with some aspects of the disclosure as detailed in the appended claims.

A parking mechanism in an air treatment device is often designed on wheels of a device body, when a parking state is triggered, a parking wrench on each wheel needs to be manually locked to complete a parking action.

Since the parking mechanism is fixed to the wheels, and manual parking is needed, the wheels have to be arranged on a chassis of the air treatment device in a completely exposed mode in the appearance design. It is not conducive to the aesthetics and practicality development trend of the air treatment device, and user experience is poor.

With the increasing demand of the public for convenience and aesthetics of products, a design scheme of extending a peripheral wall of a product shell to the ground to cover the casters often appears in relevant air treatment devices. Under such appearance design, a parking mechanism in the related art lacks convenience and practicality.

In order to solve the above technical problems, according to some examples of the disclosure, an air treatment device 100 is provided. In some examples involved in the disclosure, the air treatment device 100 may be any mobile device with wheels.

Figure 1:
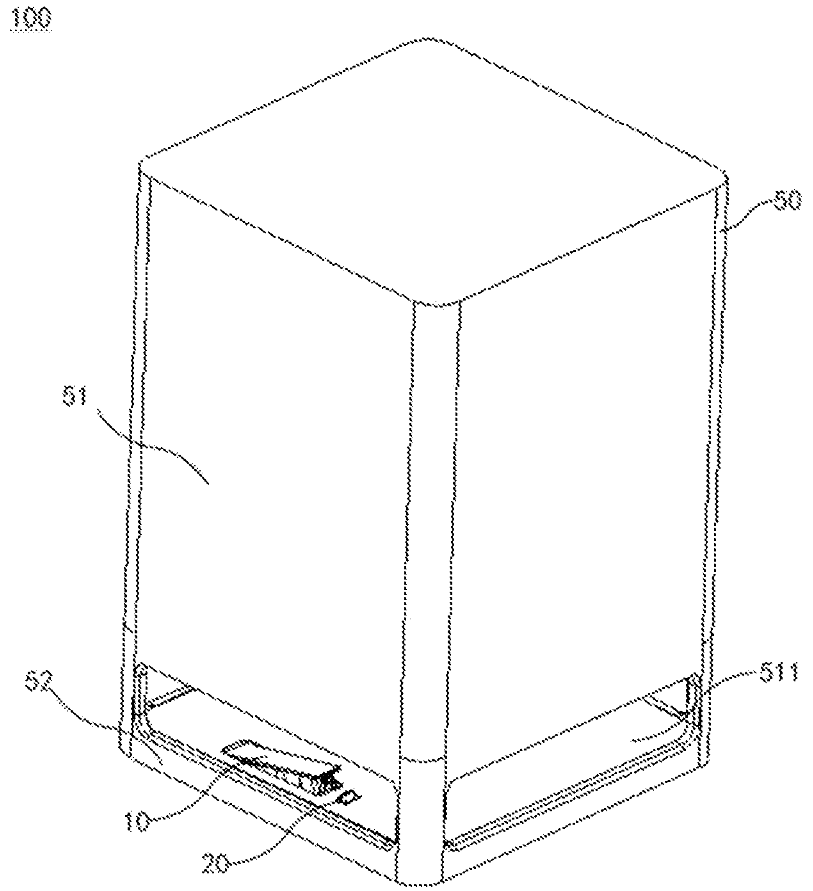
FIG. 1 is a schematic structural diagram of an air treatment device in a direction illustrated according to some examples.
Figure 2:
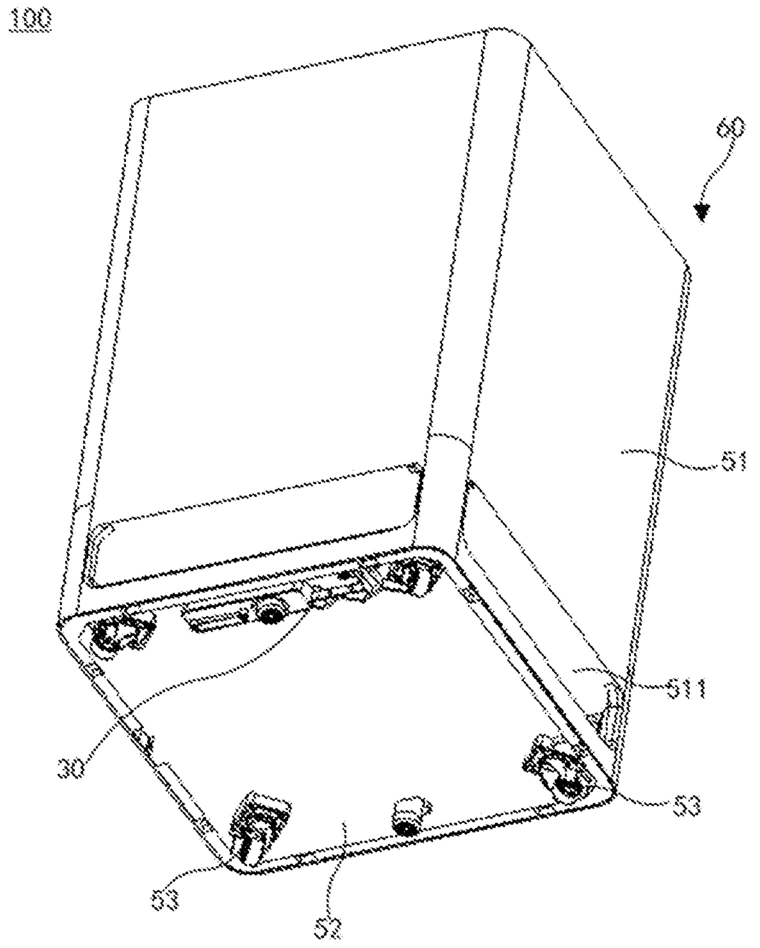
FIG. 2 is a schematic structural diagram of an air treatment device in another direction illustrated according to some examples.
Figure 3:
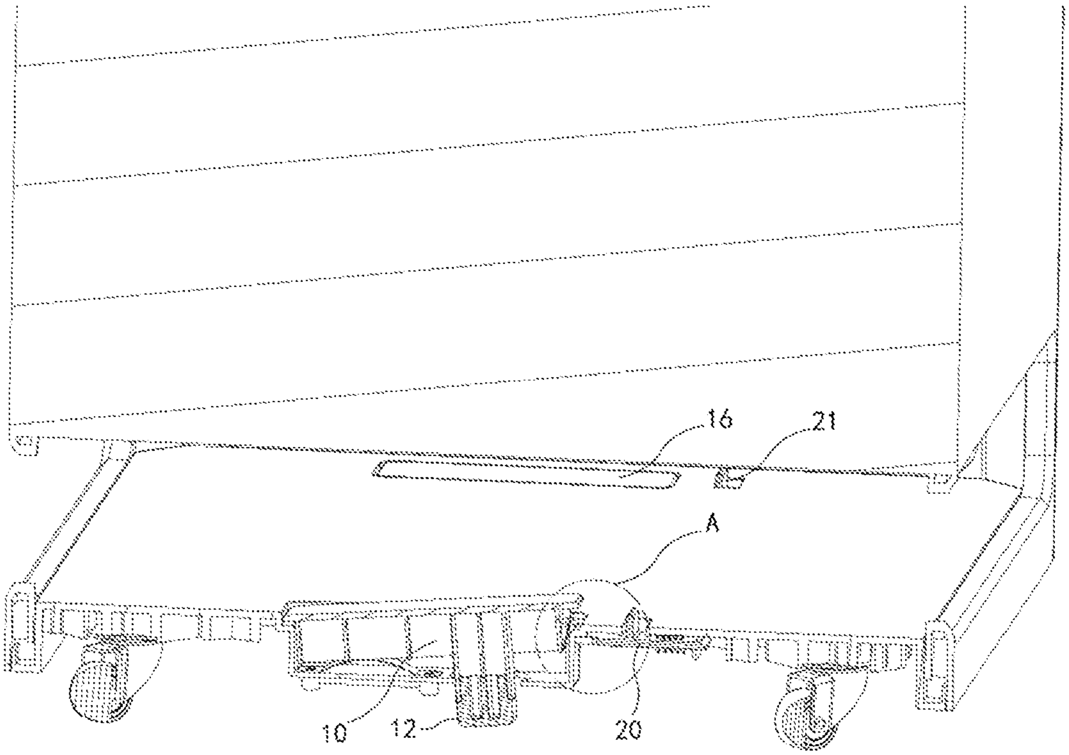
FIG. 3 is a schematic diagram of a parking mechanism of an air treatment device in a free state illustrated according to some examples.
Figure 4:
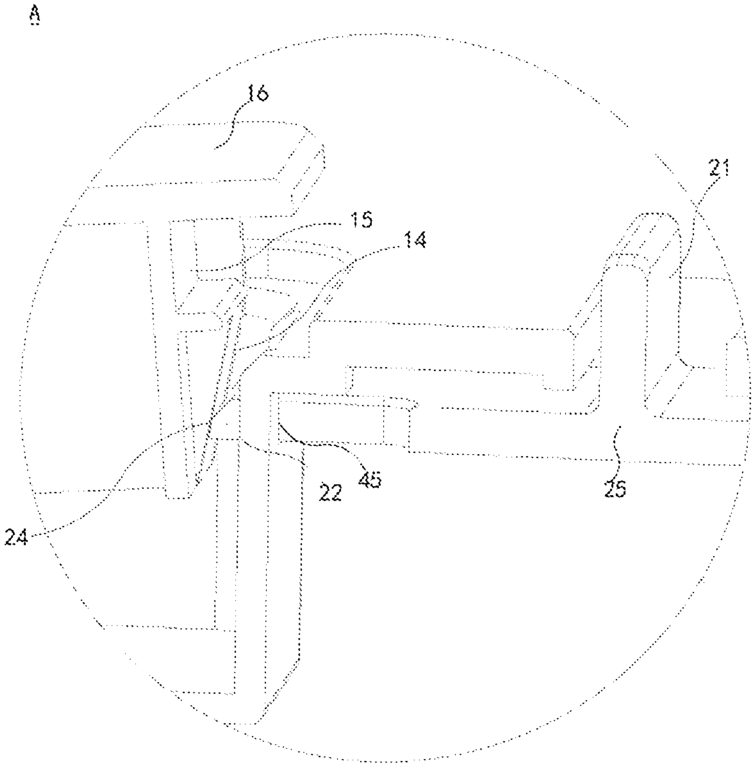
FIG. 4 is an enlarged view of a part A in FIG. 3.
Figure 5:
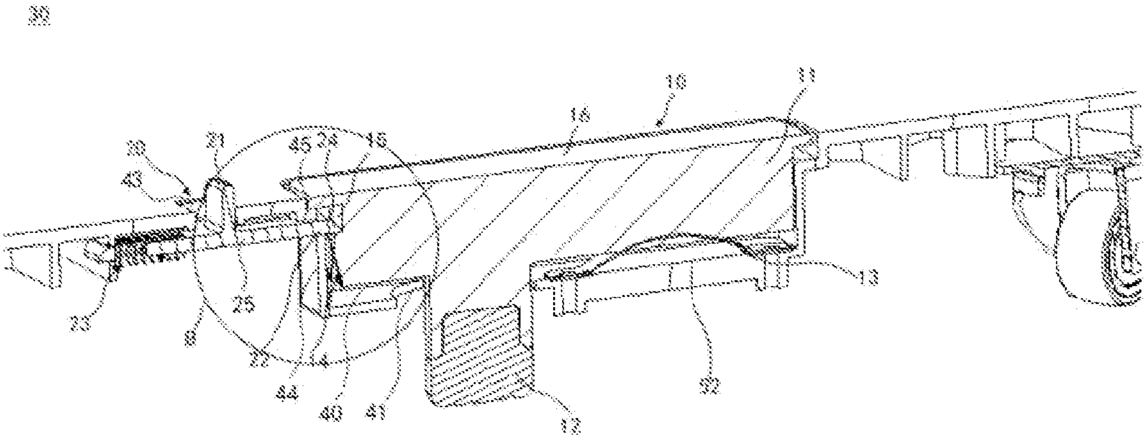
FIG. 5 is a schematic diagram of a parking mechanism of an air treatment device in a parking state illustrated according to some examples.
Figure 6:
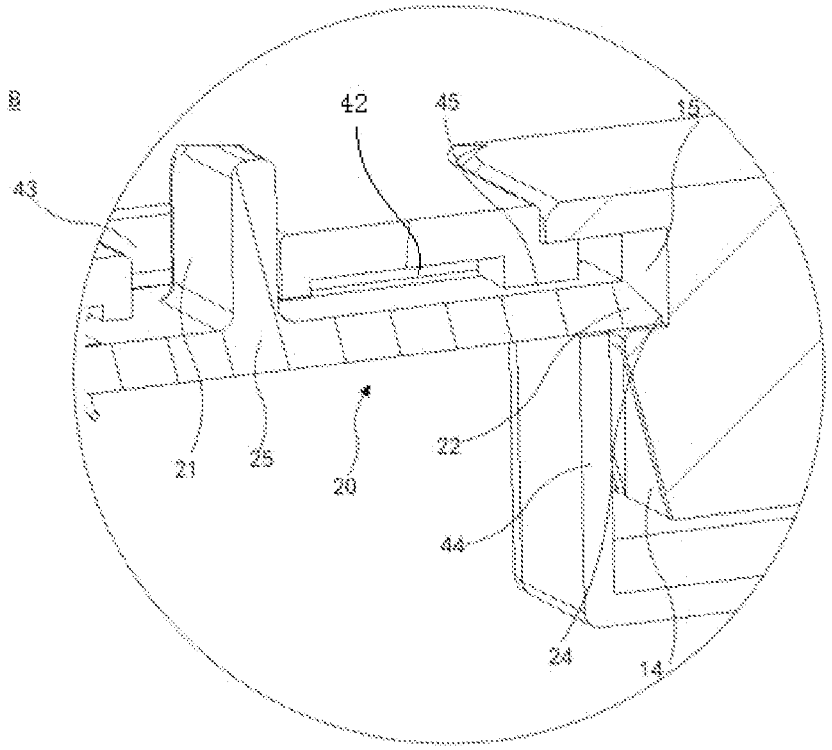
FIG. 6 is an enlarged view of a part B in FIG. 5.
Figure 7:
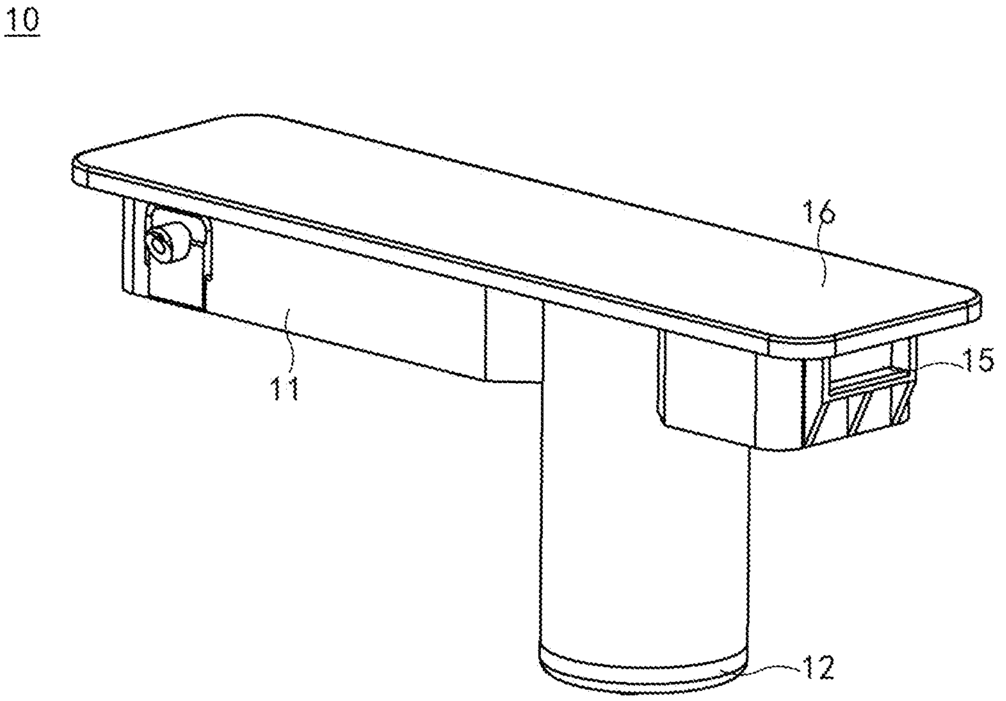
FIG. 7 is a structural front view of a parking piece illustrated according to some examples.
Figure 8:
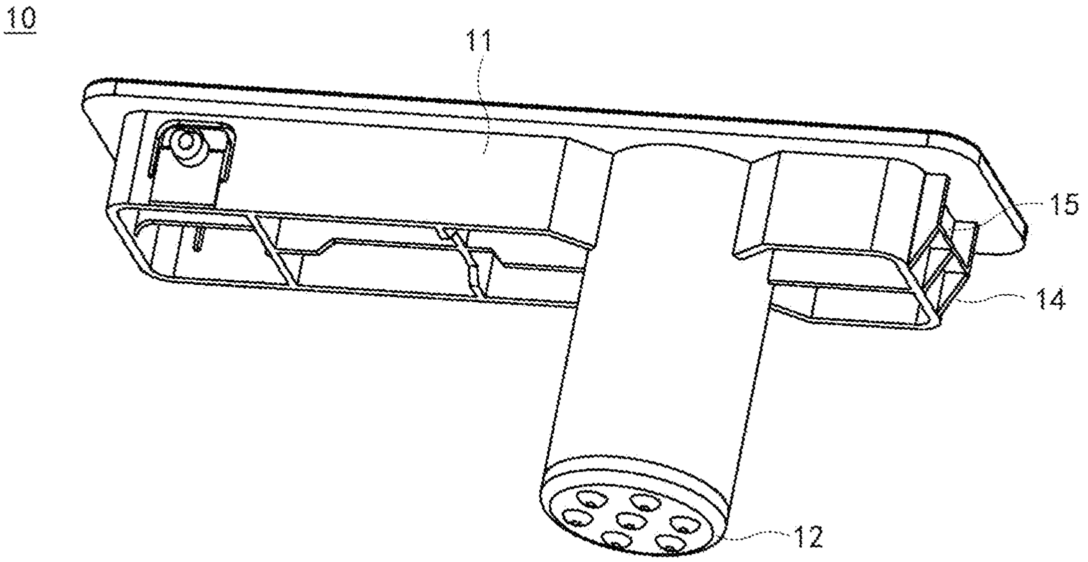
FIG. 8 is a structural bottom view of a parking piece illustrated according to some examples.
Figure 9:
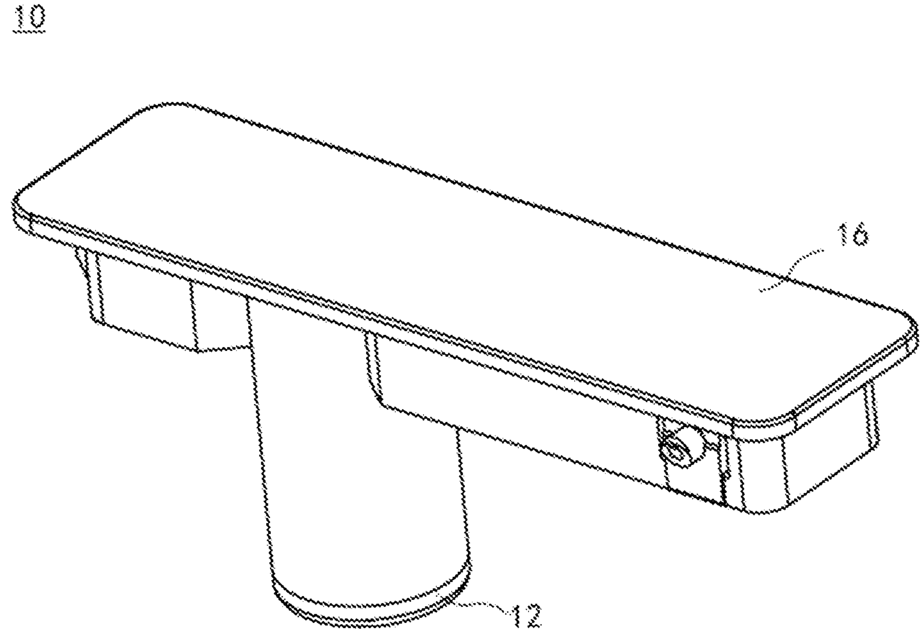
FIG. 9 is a structural rear view of a parking piece illustrated according to some examples.
Figure 10:
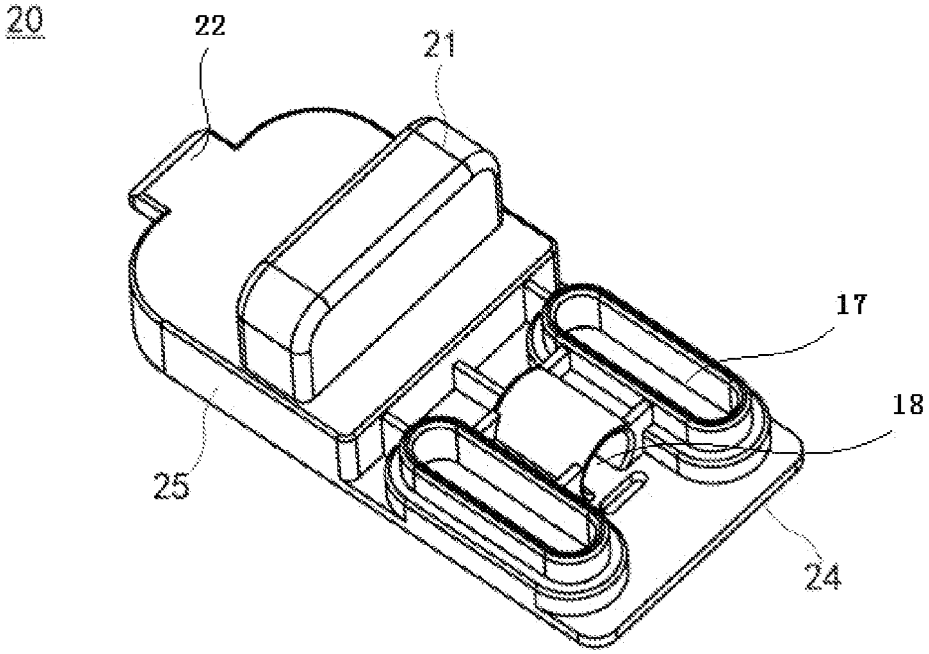
FIG. 10 is a structural perspective view of a limiting piece illustrated according to some examples.

FIG. 1 is a schematic structural diagram of an air treatment device in a direction illustrated according to some examples. FIG. 2 is a schematic structural diagram of an air treatment device in another direction illustrated according to some examples. FIG. 3 is a schematic diagram of a parking mechanism of an air treatment device in a free state illustrated according to some examples. FIG. 4 is an enlarged view of a part A in FIG. 3. FIG. 5 is a schematic diagram of a parking mechanism of an air treatment device in a parking state illustrated according to some examples. FIG. 6 is an enlarged view of a part B in FIG. 5. FIG. 7 is a structural front view of a parking piece illustrated according to some examples. FIG. 8 is a structural bottom view of a parking piece illustrated according to some examples. FIG. 9 is a structural rear view of a parking piece illustrated according to some examples. FIG. 10 is a structural perspective view of a limiting piece illustrated according to some examples.

In some examples, as shown in FIG. 1 and FIG. 2, the air treatment device 100 includes a device body 60 configured for air treatment, wheels 53 and a parking mechanism 30, and the wheels 53 are arranged on the device body 60 and configured to drive the device body 60 to move.

The parking mechanism 30 is movably connected to the device body 60, the parking mechanism 30 can move relative to the device body 60 to be in contact with or separated from the ground, such that the air treatment device 100 is in a parking state or a free state.

When the parking mechanism 30 is in contact with the ground, the air treatment device 100 is in the parking state, and the wheels 53 cannot drive the device body 60 to move. When the parking mechanism 30 is separated from the ground, the air treatment device 100 is in the free state, and the wheels 53 may drive the device body 60 to move freely.

Compared with the related art, the parking mechanism 30 of the disclosure is different from parking wrenches arranged on the wheels 53, and is arranged independently of the wheels 53. One or more parking mechanisms 30 may be arranged on the same device, and an arrangement position of the parking mechanism 30 is more flexible. When a parking action is initiated, it is not needed to probe a bottom of the device to be in contact with the wheels 53. Thus, compared with the related art, the arrangement position of the parking mechanism 30 of the air treatment device 100 is more flexible, it is more convenient to start and park, and the wheels 53 may be hidden in the appearance design, which is more beautiful.

A technical solution provided by the examples of the disclosure may include the following beneficial effects: when a parking mechanism is installed on the air treatment device of the disclosure, the parking mechanism may be installed at any position of the chassis, during parking, the parking state may be triggered merely by stepping on the external force applying surface, without manually tightly pressing a parking wrench on each wheel. The air treatment device may be designed as caster-hidden appearance, so that a product is more ornamental.

The parking mechanism 30 includes: a parking piece 10, which can move from an initial position to a lowest position when subjected to a downward action force and is in contact with the ground when being in a state of the lowest position; and a limiting piece 20, configured to be clamped with the parking piece 10 when the parking piece 10 is in the lowest position, so as to lock a parking state of the parking piece 10.

The parking piece 10 is arranged in the device body 60 and can move relative to the device body 60, which is an important component of the parking mechanism 30 to realize parking of the air treatment device 100. The parking piece 10 does not overlap with the wheels 53 on the device body 60 in position, so that the air treatment device 100 may be selectively in the parking state or the free state.

The parking piece 10 is movably connected with the device body 60 through a shaft rod or a torsion spring, the degree of freedom of movement of the parking piece 10 is defined by the connection mode, so that the parking piece 10 can move from the initial position to the lowest position when subjected to the downward action force. The parking piece 10 is in contact with the ground when in the lowest position, and at this time, the device body 60 is in the parking state.

It needs to be noted that in the disclosure, the connection mode between the parking piece 10 and the device body 60 is not limited. The connection mode between the parking piece 10 and the device body 60 includes, but not limited to a connection between the shaft rod and the torsion spring, and may also be any connection mode that can make the parking piece 10 movable relative to the device body 60.

The limiting piece 20 is suitable for being in clamping fit with the parking piece 10 when the parking piece 10 moves to the lowest position, so as to keep the parking piece 10 constantly in the parking state.

In some examples, the limiting piece 20 is configured to be clamped and fixed to the parking piece 10, so as to keep the parking piece 10 in the lowest position. When the limiting piece 20 is separated from the parking piece 10, the parking piece 10 returns to the initial position, and the device body 60 returns to the free state from the parking state.

In some examples, a bottom of the device body 60 is provided with a first accommodating groove 40 with an opening facing upwards; and the parking piece 10 is movably arranged in the first accommodating groove 40 and can move up and down in the first accommodating groove 40.

In some examples, the parking piece 10 includes a pressure bearing part 11 and a contact part 12 arranged at a bottom end of the pressure bearing part 11, the pressure bearing part 11 is arranged in the first accommodating groove 40 in an embedded mode, a chassis of the first accommodating groove 40 is provided with a first through hole 41 penetrating through the chassis, and the contact part 12 is arranged in the first through hole 41 in a penetrating mode.

As shown in FIG. 5, the parking piece 10 includes the pressure bearing part 11 and the contact part 12. The contact part 12 is arranged on a lower surface of the pressure bearing part 11 and protrudes downward, and a bottom surface of the contact part 12 is in selective contact with the ground with the movement of the parking piece 10.

The first accommodating groove 40 is a groove formed in the chassis 52 for the parking piece 10 to accommodate the pressure bearing part 11, a lower side surface of the first accommodating groove 40 is provided with a via hole suitable for circular arc movement of the contact part 12, the via hole is configured as the first through hole 41, the contact part 12 penetrates through the first through hole 41 to be in contact with the ground, and a radial size of the first through hole 41 is larger than a radial size of the contact part 12.

When the parking piece 10 is in the parking state, the pressure bearing part 11 is located in the first accommodating groove 40. If there is no limiting piece 20 matched to fix the parking piece 10, the parking piece 10 may still move up and down relative to the device body 60. When the limiting piece 20 is in clamping fit with the parking piece 10, the parking piece 10 cannot move relative to the device body 60. At this time, the device body 60 is constantly kept in the parking state.

In some examples, an upper surface of the pressure bearing part 11 is configured as an external force applying surface 16.

The external force applying surface 16 is equivalent to a parking pedal. When the parking action is initiated, the external force applying surface 16 is pressed toward the ground, so that the contact part 12 may penetrate through the first through hole 41 and be in contact with the ground. When the parking piece 10 moves to the lowest position, the limiting piece 20 is clamped and fixed to the parking piece 10, the bottom surface of the contact part 12 is in complete contact with the ground, and it is supported that the parking action is completed when the device body 60 does not move on a plane.

In this example, the contact part 12 is configured as a cylindrical component. It needs to be noted that a shape of the contact part 12 includes, but not limited to the cylindrical component, and may also be any shape that can be in corresponding fit with a contact surface.

In some examples, a bottom side of the contact part 12 is partially configured as a rubber piece. When the contact part 12 supports the device body 60, friction between the contact part 12 and the ground may be increased, so that a parking effect is remarkable, and parking stability is not prone to being affected due to complex road conditions.

In some examples, a side wall of the parking piece 10 close to the limiting piece 15 has a limiting groove 15; and one end of the limiting piece 20 can be arranged in the limiting groove 15 in an embedded mode, so as to limit the parking piece 10.

The limiting groove 15 is formed in one side of the parking piece 10 in contact with the limiting piece 20, and a space size of the limiting groove 15 is suitable for being clamped with one end of the limiting piece 20. The parking piece 10 is clamped and fixed to the limiting piece 20 through the limiting groove 15 to complete position limitation of the parking piece 10, so as to achieve the parking effect.

In some examples, a bottom of the device body 60 is provided with a chassis 52, the chassis 52 includes a first surface and a second surface, the first surface faces the bottom of the device body 60, the second surface is a back face of the first surface, and an interval with a preset distance exists between the first surface and a bottom surface of the device body 60; and the first surface is provided with a first accommodating groove 40, and the parking mechanism 30 is at least partially arranged in the first accommodating groove 40.

A plurality of wheels 53 are arranged on the first surface of the chassis 52 and configured to drive the device body 60 to move freely in a plane. An interval with a preset distance exists between the first surface of the chassis and the ground, and the interval space is used for movement of the parking piece 10, so as to change the parking state of the device body 60.

The second surface of the chassis 52 is opposite to the first surface of the chassis 52, and the second surface of the chassis 52 has exposed parts of the parking piece 10 and the limiting piece 20.

In some examples, the bottom of the device body 60 is provided with a second accommodating groove 42 with an opening facing downward; and the limiting piece 20 is movably arranged in the second accommodating groove 42 and can move left and right in the second accommodating groove 42.

The second accommodating groove 42 does not overlap with the first accommodating groove 40 in space, and the second accommodating groove 42 is suitable for accommodating the limiting piece 20 and its moving space. The limiting piece 20 moves left and right in the second accommodating groove 42, so as to complete a clamping and separation action with the parking piece 10.

In some examples, the limiting piece 20 includes a handle 21 and a base plate 25 arranged at a bottom end of the handle 21, and the base plate 25 is movably arranged in the second accommodating groove 42 in an embedded mode; and a top wall of the second accommodating groove 42 is provided with a second through hole 43 penetrating through the top wall, and the handle 21 is arranged in the second through hole 43 in a penetrating mode.

The limiting piece 20 is a movable component, the base plate 25 and at least part of the handle 21 are arranged in the second accommodating groove 42, the handle 21 may drive the base plate 25 to translate transversely within an opening range of the second through hole 43, and the moving space of the limiting piece 20 is limited by the second through hole 43.

In some examples, the first accommodating groove 40 and the second accommodating groove 42 have an isolation wall 44; the isolation wall 44 is provided with a third through hole 45; and one end of the base plate 25 close to the parking piece 10 is provided with a push abutting part 22, and the push abutting part 22 can penetrate through the third through hole 45 when moving left and right.

The push abutting part 22 is one end of the limiting piece 20 close to the parking piece 10, specifically, the push abutting part 22 of the limiting piece 20 is in contact with the parking piece 10 in the free state.

The first accommodating groove 40 does not overlap the second accommodating groove 42 in space, the isolation wall 44 exists between the two, and the third through hole 45 is an opening in the isolation wall 44 suitable for the push abutting part 22 to pass through.

When the parking action starts, the parking piece 10 is in abutting fit with the push abutting part 22, the parking piece 10 moves towards the ground to drive the limiting piece 20 to move transversely in a direction away from the parking piece 10 until the push abutting part 22 slides into the limiting groove 15, and the limiting piece 20 is in clamping fit with the limiting groove 15 to complete parking.

When the push abutting part 22 exits the third through hole 45 and then exits the limiting groove 15, and the limiting piece 20 is completely in the second accommodating groove 42, the parking piece 10 resets to the initial position, the device body 60 is in the free state, and the wheels 53 may drive the device body 60 to move freely.

In some examples, a mounting part which can mount the limiting piece 20 at the bottom of the device main body 60 is arranged between the limiting piece 20 and the device main body 60, and the mounting part is further configured to limit a move stroke of the limiting piece 20 relative to the device body 60. That is, the mounting part cannot merely mount the limiting piece 20 at the bottom of the device body 60, but also will not fix the limiting piece 20 to the bottom of the device body 60 and make it incapable of moving relative to the device body 60, and the mounting part may move relative to the device body 60.

A plurality of mounting parts are arranged on the limiting piece 20, and the connection between the limiting piece 20 and the device body 60 is firmer because of arrangement of the mounting parts. The limiting piece 20 moves within a range defined by the mounting parts, so as to complete matching between the push abutting part 22 and the limiting groove 15.

In some examples, the mounting part includes: a limiting hole 17 and a limiting column (not shown) in sliding fit with the limiting hole 17, the limiting hole 17 is configured as a long strip hole extending in a moving direction of the limiting piece 20, one of the limiting hole 17 and the limiting column is arranged on the limiting piece 20, and the other one of the limiting hole 17 and the limiting column is arranged at the bottom of the device body 60.

In some examples, the limiting hole 17 may be formed in the device body 60, at this time, the limiting column may penetrate through the limiting hole 17 and slide relative to the limiting hole 17. Since the limiting hole 17 is the long strip hole and matches the limiting column fixed to the device body 60, the limiting piece 20 can merely slide within a length range of the limiting hole 17. Thus, the move stroke of the limiting piece 20 is limited, which prevents the limiting piece 20 from being separated from the device body 60.

The parking piece 10 further includes: a first wedge-shaped surface 14, the first wedge-shaped surface 14 is arranged on the parking piece 10, and the first wedge-shaped surface 14 is in abutting fit with the push abutting part 22, so as to drive the limiting piece 20 to move horizontally when the parking piece 10 moves up and down.

The push abutting part 22 is one end of the limiting piece 20 close to the parking piece 10, the first wedge-shaped surface 14 is configured as a surface of the parking piece 10 in contact with the limiting piece 20, and the push abutting part 22 is in contact with the first wedge-shaped surface 14 on the parking piece 10 in the free state.

When the parking action starts, the first wedge-shaped surface 14 moves towards the ground with the parking piece 10, the first wedge-shaped surface 14 is in abutting fit with the push abutting part 22 to drive the limiting piece 20 to move transversely in a direction away from the parking piece 10 until the push abutting part 22 slides into the limiting groove 15 in an upper end of the first wedge-shaped surface 14, and the limiting piece 20 is driven to be in clamping fit with the limiting groove 15 to complete the parking action.

In some examples, the push abutting part 22 is provided with a second wedge-shaped surface 24 suitable for being in face-to-face fit with the first wedge-shaped surface 14.

As shown in FIG. 6, in the free state, the first wedge-shaped surface 14 and the second wedge-shaped surface 24 are in fit by attachment and abut against each other. In a process of the parking action, the design of face-to-face fit may be used as a buffer to reduce the friction of the parking piece 10 on the push abutting part 22 during pressing, at the same time, in a process of recovering the free state from the parking state, the damage to parts caused by the parking piece 10 hitting the limiting piece 20 is reduced, and a service life of the parking mechanism 30 is prolonged.

In some examples, the parking mechanism 30 further includes a first elastic piece 13 in contact with the parking piece 10, the first elastic piece 13 is configured to recover the parking piece 10 from the lowest position to the initial position under an elastic action of the first elastic piece 13. The first elastic piece 13 is arranged between the chassis 52 of the first accommodating groove 40 and the parking piece 10.

The first elastic piece 13 is configured as an elastic sheet, which is arranged between the chassis 52 and the pressure bearing part 11. When the air treatment device 100 is in the free state, the parking piece 10 is subjected to a vertical upward elastic force due to the existence of the elastic sheet, so that the bottom of the contact part 12 is separated from the ground, and the parking state is relieved.

In the free state, the first elastic piece 13 at the bottom of the first accommodating groove 40 is in a relaxed state, the pressure bearing part 11 is sprung up, the limiting piece 20 is not in contact with the limiting groove 15, and the parking piece 10 may move relative to the device body 60.

When the parking action is initiated, the parking piece 10 moves towards the ground to extrude the limiting piece 20 to move in a direction away from the parking piece 10, the limiting piece 20 slides on the first wedge-shaped surface 14, when the pressure bearing part 11 is assembled into the first accommodating groove 40, the first elastic piece 13 is in an energy storage state, and the push abutting part 22 close to the parking piece 10 slides into the limiting groove 15.

At this time, the limiting piece 20 is in fit with the limiting groove 15, so that the parking piece 10 is clamped and fixed to the limiting piece 20. At this time, the parking piece 10 cannot move relative to the device body 60, and the air treatment device 100 is constantly kept in the parking state. When parking is relieved, the parking piece 10 may be reset under an action of the first elastic piece 13, the contact part 12 on the parking piece 10 is separated from the ground, so that the device body 60 is in the free state and can move.

In some examples, the parking mechanism 30 further includes a second elastic piece 23 in contact with the limiting piece 20, the second elastic piece 23 is configured to apply force to the limiting piece 20 under an elastic action of the second elastic piece, so that the limiting piece 20 has kinetic energy moving towards the parking piece 10.

In some examples, the limiting piece 20 is movably arranged on the device body 60, and the second elastic piece 23 which often makes the limiting piece 20 move towards the parking piece 10 is arranged between the limiting piece 20 and the device body 60.

In some examples, the second elastic piece 23 is arranged between a side wall of the second accommodating groove 42 and the limiting piece 20. The limiting piece 20 is a movable component, which may translate transversely within a range of the third through hole 45, so the degree of freedom of movement of the limiting piece 20 in space is limited. One end of the limiting piece 20 away from the parking piece 10 is provided with a clamping groove suitable for being connected with the second elastic piece 23, and the second elastic piece 23 is connected with the limiting piece 20 through a buckle.

In some examples, the limiting piece 20 is provided with a limiting ring 18, and the limiting ring 18 is in contact with one end of the second elastic piece 23.

One end of the second elastic piece 23 is connected with the limiting ring 18. When the parking piece 10 initiates the parking action, the second elastic piece 23 is compressed in the limiting ring 18 until the push abutting part 22 matches the limiting groove 15 to complete parking. At this time, at least part of the second elastic piece 23 is exposed outside the limiting ring 18.

In this example, the second elastic piece 23 is configured as a spring. When the air treatment device 100 is in the parking state, the push abutting part 22 on the limiting piece 20 is clamped with the limiting groove 15 in the parking piece 10, so that the air treatment device 100 is kept in the parking state. In order to relieve the parking state of the air treatment device 100, it is needed to pull the limiting piece 20, so that the push abutting part 22 on the limiting piece 20 is separated from the limiting groove in the parking piece 10. At this time, the parking piece 10 will move upward under the action of the first elastic piece 13, and the first wedge-shaped surface 14 on the parking piece 10 will move to a position directly opposite to the push abutting part 22. At this time, the limiting piece 20 is released, the push abutting part 22 on the limiting piece 20 will be in fit with the first wedge-shaped surface 14 under the action of the first elastic piece 13, and at this time, the air treatment device 100 is in the free state.

When the air treatment device 100 needs to be relieved from the free state, the parking piece 10 needs to be stepped downward, at this time, the first elastic piece 13 accumulates energy, and the first wedge-shaped surface 14 may push the push abutting part 22 on the limiting piece 20 to move horizontally and make the second elastic piece 23 accumulate energy. After the push abutting part 22 is separated from the first wedge-shaped surface 14, the push abutting part 22 may be in clamping fit with the limiting groove 15 under pushing of the second elastic piece 23, so that parking of the air treatment device 100 is realized.

In some examples, the device body 60 includes: an outer housing 50, the outer housing 50 includes a chassis 52, and the chassis 52 is provided with the wheels 53 and the parking mechanism 30.

Specifically, the wheels 53 are connected and fixed to the chassis 52 through screws. The device body 60 may be driven by the wheels 53 to move, and at least three wheels 53 are arranged on the chassis 52 of the device body 60, so that the air treatment device 100 may stand stably on the plane.

The parking mechanism 30 is arranged on the chassis of the device body 60 independently of the wheels 53. One or more parking mechanisms 30 may be arranged on the air treatment device 100, the bottom of the contact part 12 of the parking mechanism 30 is in contact with the ground, which supports the device body 60 or considers that the parking effect is achieved when the device body 60 does not move on the plane. Compared with the related art, the parking mechanism 30 makes the parking effect of the air treatment device 100 on complex roads, such as slopes and mountains, be more significant.

In some examples, the outer housing 50 further includes: a peripheral wall 51, the peripheral wall 51 is formed on an outer circumference of the chassis 52 and extends upwards, and the peripheral wall 51 is provided with an avoidance hole 511 suitable for exposing the parking mechanism 30.

Since the parking state of the parking mechanism 30 in the disclosure needs to be controlled manually, and the peripheral wall 51 of the device main body 60 is provided with the avoidance hole 511 suitable for exposing the parking mechanism 30, which is convenient for controlling the parking state in the use of the air treatment device 100.

The position of the avoidance hole 511 is at one side of the peripheral wall 51 approaching the ground. In actual operations, the external force applying surface 16 may be configured as a parking pedal, and the parking state is adjusted by stepping the parking pedal or pulling the handle 21 of the limiting piece 20. Compared with the design that parking wrenches are mounted on the wheels 53 in the related art, the air treatment device 100 provided with the parking mechanism 30 does not need to be operated by leaning down when parking, manpower is saved, and the parking effect is more stable.

It can be seen from the above structure that the parking mechanism 30 of the air treatment device 100 in the disclosure is designed independently of the wheels 53, and can be mounted at any position of the chassis 52 that does not overlap the wheels 53. One or more parking mechanisms 30 can be mounted on the same device. When the parking state is triggered, it is merely needed to step on the external force applying surface 16 to make the parking piece 10 extrude the limiting piece 20 until the push abutting part 22 of the limiting piece is clamped with the limiting groove 15 to complete the parking action.

Specifically, when parking is initiated, the first wedge-shaped surface 14 of the parking piece 10 is in face-to-face fit with the second wedge-shaped surface 24 of the limiting piece 20, resistance in the pressing process is reduced, the push abutting part 22 is in abutting fit with the first wedge-shaped surface 14, a pressure towards the ground is transmitted through the parking piece 10, which forces the second elastic piece 23 to move in a direction away from the parking piece 10, the first wedge-shaped surface 14 slides on the surface of the second wedge-shaped surface 24 from bottom to top until it slides into the limiting groove 15 in the upper side of the second wedge-shaped surface 24, the limiting piece 20 is in clamping fit with the limiting groove 15, the parking piece 10 does not move relative to the device body, and the bottom side of the contact part 12 is in contact with the ground to complete the parking action.

When the parking state is relieved, the handle 21 on the limiting piece 20 merely needs to be poked towards one end away from the parking piece 10, so that the second elastic piece 23 is compressed, the limiting piece 20 is separated from the limiting groove 15, at the same time, the first elastic piece 13 is relaxed, the pressure bearing part 11 is sprung up to move upwards in a fixed direction of a shaft rod for a distance, the contact part 12 is separated from the ground, and the parking state is relieved.

At this time, the limiting piece 20 is reset, and the second wedge-shaped surface 24 of the limiting piece 20 is in face-to-face fit with the first wedge-shaped surface 14 on the parking piece 10.

The air treatment device 100 may be an electronic device, such as a humidifier, a vertical air conditioner, a washing machine, or a support platform, such as a transfer rack and a console, as well as a transportation device, a medical device, a fitness device, and various other mobile devices with wheels.

It can be understood that the air treatment device provided by the example of the disclosure contains a corresponding hardware structure and/or software module to perform each function in order to realize the above functions. In combination with units and algorithm steps of each instance disclosed in the examples of the disclosure, the examples of the disclosure can be implemented in the form of hardware or a combination of hardware and computer software. Whether a function is performed by hardware or computer software driving hardware depends on the specific application and design constraints of the technical solutions. Those skilled in the art can use different methods to implement the described functions for each specific application, but such implementation should not be considered to be beyond the scope of the technical solutions of the examples of the disclosure.

As for the air treatment device in the above examples, the specific manner in which each module performs operations has been described in detail in the examples related to the air treatment device, and detailed description will not be given here.

It can be understood that "a plurality of" in the disclosure refers to two or more, and other quantifiers are similar to this. "And/or" describes the association relationship of associated objects, which means that there may be three kinds of relationships, for example, A and/or B may mean that there are three cases: A alone, A and B together, and B alone. The character "/" universally indicates that associated objects are in an "or" relationship. The singular forms "one", "said" and "the" are also intended to include the plural form unless the context clearly indicates other meanings.

It can be further understood that the terms "first", "second" and the like are used to describe various information, but the information should not be limited to these terms. These terms are merely used to distinguish the same type of information from each other, and do not indicate a specific order or importance. In fact, the expressions "first" and "second" can be used interchangeably. For example, without departing from the scope of the disclosure, first information may also be referred to as second information, and similarly, the second information may also be referred to as the first information.

It can be further understood that directional or positional relationships indicated by terms such as "center", "longitudinal", "transverse", "front", "rear", "upper", "lower", "left", "right", "vertical", "horizontal", "top", "bottom", "inner", and "outer" are based on directional or positional relationships as shown in the accompanying drawings, and are merely for the purposes of facilitating describing the examples and simplifying the description, rather than indicating or implying that the referred apparatus or element has to have a specific direction or be constructed and operated in the specific direction.

It can be further understood that unless otherwise specified, "connection" includes a direct connection between the two without other members, and also includes an indirect connection between the two with other elements.

It can be further understood that in the examples of the disclosure, although the operations are described in a specific order in the accompanying drawings, it should not be understood as requiring these operations to be performed in the specific order or serial order shown, or requiring all the operations shown to be performed to achieve the desired results. Multitasking and parallel processing may be advantageous in a particular environment.

Other examples of the disclosure will be apparent to those skilled in the art from consideration of the specification and practice of the disclosure here. The disclosure is intended to cover any variations, uses, or adaptations of the disclosure following its general principles and including such departures from the disclosure as come within known or customary practice in the art. It is intended that the specification and examples are considered as examples merely, with a true scope of the disclosure being indicated by the following claims.

It will be appreciated that the disclosure is not limited to the exact construction that has been described above and illustrated in the accompanying drawings, and that various modifications and changes may be made without departing from its scope. It is intended that the scope of the disclosure is merely limited by the appended claims.

In some examples, the parking mechanism includes a parking piece, which can move from an initial position to a lowest position when subjected to a downward action force and is in contact with the ground when being in a state of the lowest position; and a limiting piece, configured to be clamped with the parking piece when the parking piece is in the lowest position, so as to lock a parking state of the parking piece.

In some examples, a bottom of the device body is provided with a first accommodating groove with an opening facing upwards; and the parking piece is movably arranged in the first accommodating groove and can move up and down in the first accommodating groove.

In some examples, the parking piece includes a pressure bearing part and a contact part arranged at a bottom end of the pressure bearing part; the pressure bearing part is arranged in the first accommodating groove in an embedded mode; and a chassis of the first accommodating groove is provided with a first through hole penetrating through the chassis, and the contact part is arranged in the first through hole in a penetrating mode.

In some examples, a side wall of the parking piece close to the limiting piece has a limiting groove; and one end of the limiting piece can be arranged in the limiting groove in an embedded mode, so as to limit the parking piece.

In some examples, a chassis is arranged at a bottom of the device body, the chassis includes a first surface and a second surface, the first surface faces the bottom of the device body, the second surface is a back face of the first surface, and an interval with a preset distance exists between the first surface and a bottom surface of the device body; and the first surface is provided with a first accommodating groove, and the parking mechanism is at least partially arranged in the first accommodating groove.

In some examples, a bottom of the device body is provided with a second accommodating groove with an opening facing downward; and the limiting piece is movably arranged in the second accommodating groove and can move left and right in the second accommodating groove.

In some examples, the limiting piece includes a handle and a base plate arranged at a bottom end of the handle; the base plate is movably arranged in the second accommodating groove in an embedded mode; and a top wall of the second accommodating groove is provided with a second through hole penetrating through the top wall, and the handle is arranged in the second through hole in a penetrating mode.

In some examples, the first accommodating groove and the second accommodating groove have an isolation wall; the isolation wall is provided with a third through hole; and one end of the base plate close to the parking piece is provided with a push abutting part, and the push abutting part can penetrate through the third through hole when moving left and right.

In some examples, a mounting part which can mount the limiting piece at the bottom of the device body is arranged between the limiting piece and the bottom of the device body, and the mounting part is further configured to limit a move stroke of the limiting piece relative to the device body.

In some examples, the mounting part includes: a limiting hole and a limiting column in sliding fit with the limiting hole, the limiting hole is configured as a long strip hole extending in a moving direction of the limiting piece, one of the limiting hole and the limiting column is arranged on the limiting piece, and the other one of the limiting hole and the limiting column is arranged at the bottom of the device body.

In some examples, a first wedge-shaped surface is arranged on the parking piece, and the first wedge-shaped surface is in abutting fit with the push abutting part to drive the limiting piece to move horizontally when the parking piece moves up and down.

In some examples, the push abutting part is provided with a second wedge-shaped surface suitable for being in face-to-face fit with the first wedge-shaped surface.

In some examples, the parking mechanism further includes a first elastic piece in contact with the parking piece, the first elastic piece is configured to recover the parking piece from the lowest position to the initial position under an elastic action of the first elastic piece.

In some examples, the first elastic piece is arranged between the chassis of the first accommodating groove and the parking piece.

In some examples, the parking mechanism further includes a second elastic piece in contact with the limiting piece, the second elastic piece is configured to apply force to the limiting piece under an elastic action of the second elastic piece, so that the limiting piece has kinetic energy moving towards the parking piece.

In some examples, the second elastic piece is arranged between a side wall of the second accommodating groove and the limiting piece.

In some examples, the limiting piece is provided with a limiting ring, and the limiting ring is in contact with one end of the second elastic piece.

In some examples, a bottom side of the contact part is at least partially configured as a rubber piece.

In some examples, an upper surface of the pressure bearing part is configured as an external force applying surface.

What is claimed is:

1. An air treatment device, comprising:

a device body, configured for air treatment;

wheels, arranged on the device body and configured to drive the device body to move; and a parking mechanism, movably connected to the device body, wherein the parking mechanism can move relative to the device body to be in contact with or separated from a ground, such that the air treatment device is in a parking state or a free state;

wherein the parking mechanism comprises:

a parking piece, which can move from an initial position to a lowest position when subjected to a downward action force and is in contact with the ground when being in a state of the lowest position; and a limiting piece, configured to be clamped with the parking piece when the parking piece is in the lowest position, so as to lock the parking state of the parking piece;

wherein a side wall of the parking piece close to the limiting piece has a limiting groove; and one end of the limiting piece can be arranged in the limiting groove in an embedded mode, so as to limit the parking piece.

2. The air treatment device according to claim 1, wherein a bottom of the device body is provided with a first accommodating groove with an opening facing upwards; and the parking piece is movably arranged in the first accommodating groove and can move up and down in the first accommodating groove.

3. The air treatment device according to claim 2, wherein the parking piece comprises a pressure bearing part and a contact part arranged at a bottom end of the pressure bearing part;

the pressure bearing part is arranged in the first accommodating groove in an embedded mode; and a chassis of the first accommodating groove is provided with a first through hole penetrating through the chassis, and the contact part is arranged in the first through hole in a penetrating mode.

4. The air treatment device according to claim 3, wherein a bottom side of the contact part is at least partially configured as a rubber piece.

5. The air treatment device according to claim 3, wherein an upper surface of the pressure bearing part is configured as an external force applying surface.

6. The air treatment device according to claim 2, wherein the bottom of the device body is provided with a second accommodating groove with an opening facing downward; and the limiting piece is movably arranged in the second accommodating groove and can move left and right in the second accommodating groove.

7. The air treatment device according to claim 6, wherein the limiting piece comprises a handle and a base plate arranged at a bottom end of the handle;

the base plate is movably arranged in the second accommodating groove in an embedded mode; and a top wall of the second accommodating groove is provided with a second through hole penetrating through the top wall, and the handle is arranged in the second through hole in a penetrating mode.

8. The air treatment device according to claim 7, wherein the first accommodating groove and the second accommodating groove has an isolation wall;

the isolation wall is provided with a third through hole; and one end of the base plate close to the parking piece is provided with a push abutting part, and the push abutting part can penetrate through the third through hole when moving left and right.

9. The air treatment device according to claim 8, wherein the parking piece further comprises:

a first wedge-shaped surface, wherein the first wedge-shaped surface is arranged on the parking piece, and the first wedge-shaped surface is in abutting fit with the push abutting part to drive the limiting piece to move horizontally when the parking piece moves up and down.

10. The air treatment device according to claim 9, wherein the push abutting part is provided with a second wedge-shaped surface suitable for being in face-to-face fit with the first wedge-shaped surface.

11. The air treatment device according to claim 8, wherein the parking mechanism further comprises a first elastic piece in contact with the parking piece, wherein the first elastic piece is configured to recover the parking piece from the lowest position to the initial position under an elastic action of the first elastic piece.

12. The air treatment device according to claim 11, wherein the first elastic piece is arranged between a chassis of the first accommodating groove and the parking piece.

13. The air treatment device according to claim 8, wherein the parking mechanism further comprises a second elastic piece in contact with the limiting piece, wherein the second elastic piece is configured to apply force to the limiting piece under an elastic action of the second elastic piece, so that the limiting piece has kinetic energy moving towards the parking piece.

14. The air treatment device according to claim 13, wherein the second elastic piece is arranged between a side wall of the second accommodating groove and the limiting piece.

15. The air treatment device according to claim 13, wherein the limiting piece is provided with a limiting ring, and the limiting ring is in contact with one end of the second elastic piece.

16. The air treatment device according to claim 6, wherein a mounting part which can mount the limiting piece at the bottom of the device body is arranged between the limiting piece and the bottom of the device body, and the mounting part is further configured to limit a move stroke of the limiting piece relative to the device body.

17. The air treatment device according to claim 16, wherein the mounting part comprises: a limiting hole and a limiting column in sliding fit with the limiting hole, wherein the limiting hole is configured as a long strip hole extending in a moving direction of the limiting piece, one of the limiting hole and the limiting column is arranged on the limiting piece, and the other one of the limiting hole and the limiting column is arranged at the bottom of the device body.

18. The air treatment device according to claim 1, wherein a chassis is arranged at a bottom of the device body, the chassis comprises a first surface and a second surface, the first surface faces the bottom of the device body, the second surface is a back face of the first surface, and an interval with a preset distance exists between the first surface and a bottom surface of the device body; and the first surface is provided with a first accommodating groove, and the parking mechanism is at least partially arranged in the first accommodating groove.

* * * * *